US007127245B2

(12) United States Patent
Almgren

(10) Patent No.: US 7,127,245 B2
(45) Date of Patent: Oct. 24, 2006

(54) ROAMING METHOD

(75) Inventor: Fredrik Almgren, Stockholm (SE)

(73) Assignee: Smarttrust AB, Stockholm (SE)

( * ) Notice: Subject to any disclaimer, the term of this patent is extended or adjusted under 35 U.S.C. 154(b) by 0 days.

(21) Appl. No.: 10/541,341

(22) PCT Filed: Dec. 3, 2003

(86) PCT No.: PCT/SE03/01881

§ 371 (c)(1),
(2), (4) Date: Jul. 5, 2005

(87) PCT Pub. No.: WO2004/066663

PCT Pub. Date: Aug. 5, 2004

(65) Prior Publication Data

US 2006/0052100 A1    Mar. 9, 2006

(30) Foreign Application Priority Data

Jan. 17, 2003    (SE)    .................................... 0300129

(51) Int. Cl.
*H04Q 7/20*    (2006.01)
*H04M 1/00*    (2006.01)

(52) U.S. Cl. ................ 455/432.1; 455/432.3; 455/435.1; 455/435.2; 455/435.3; 455/434; 455/422.1; 455/550.1; 455/452.1

(58) Field of Classification Search ........ 455/435–451, 455/418–420, 422.1, 452.1, 452.2, 403, 436, 455/433–434, 439–440, 453, 464, 560–561, 455/550.1, 552.1, 466, 456.1–456.2, 432.1–432.3; 370/328–329, 331–332; 709/202–207, 216–219, 709/222, 225–229

See application file for complete search history.

(56) References Cited

U.S. PATENT DOCUMENTS

| | | | |
|---|---|---|---|
| 5,999,811 A * | 12/1999 | Molne ...................... 455/432.3 |
| 6,122,503 A * | 9/2000 | Daly .......................... 455/419 |
| 6,192,241 B1 * | 2/2001 | Yu et al. ..................... 455/433 |
| 6,405,038 B1 * | 6/2002 | Barber et al. ............... 455/434 |
| 6,584,311 B1 * | 6/2003 | Sorenson et al. ........... 455/432 |
| 6,625,451 B1 * | 9/2003 | La Medica, Jr. et al. ... 455/434 |
| 6,961,569 B1 * | 11/2005 | Raghuram et al. ........ 455/435.1 |
| 6,965,781 B1 * | 11/2005 | Lewis ........................ 455/522 |
| 6,996,398 B1 * | 2/2006 | Powell ........................ 455/433 |
| 2002/0082049 A1 * | 6/2002 | Prise .......................... 455/558 |
| 2003/0054833 A1 * | 3/2003 | Hayduk ..................... 455/456 |
| 2003/0143989 A1 * | 7/2003 | Ho et al. .................... 455/418 |

* cited by examiner

*Primary Examiner*—Meless Zewdu
(74) *Attorney, Agent, or Firm*—Rolf Fasth; Fasth Law Offices

(57) ABSTRACT

The method relates to the management of roaming of mobile subscribers between a home network and foreign networks. The roaming behavior of a mobile terminal is based on roaming settings in the form of contents of different control files saved in the mobile terminal of the subscribers. A first file contains a list of networks to be used in a priority order in a roaming situation and a second file contains information about the last network the subscriber was registered in. The method starts with roaming of the subscriber from one network to another network, and checking the current roaming setting for the subscriber. If the network that the subscriber roamed into does not correspond to the highest priority network, the subscriber is moved to a preferred network corresponding to the priority order of said list.

15 Claims, 6 Drawing Sheets

ROAMING METHOD

PRIOR APPLICATIONS

Figure 1:
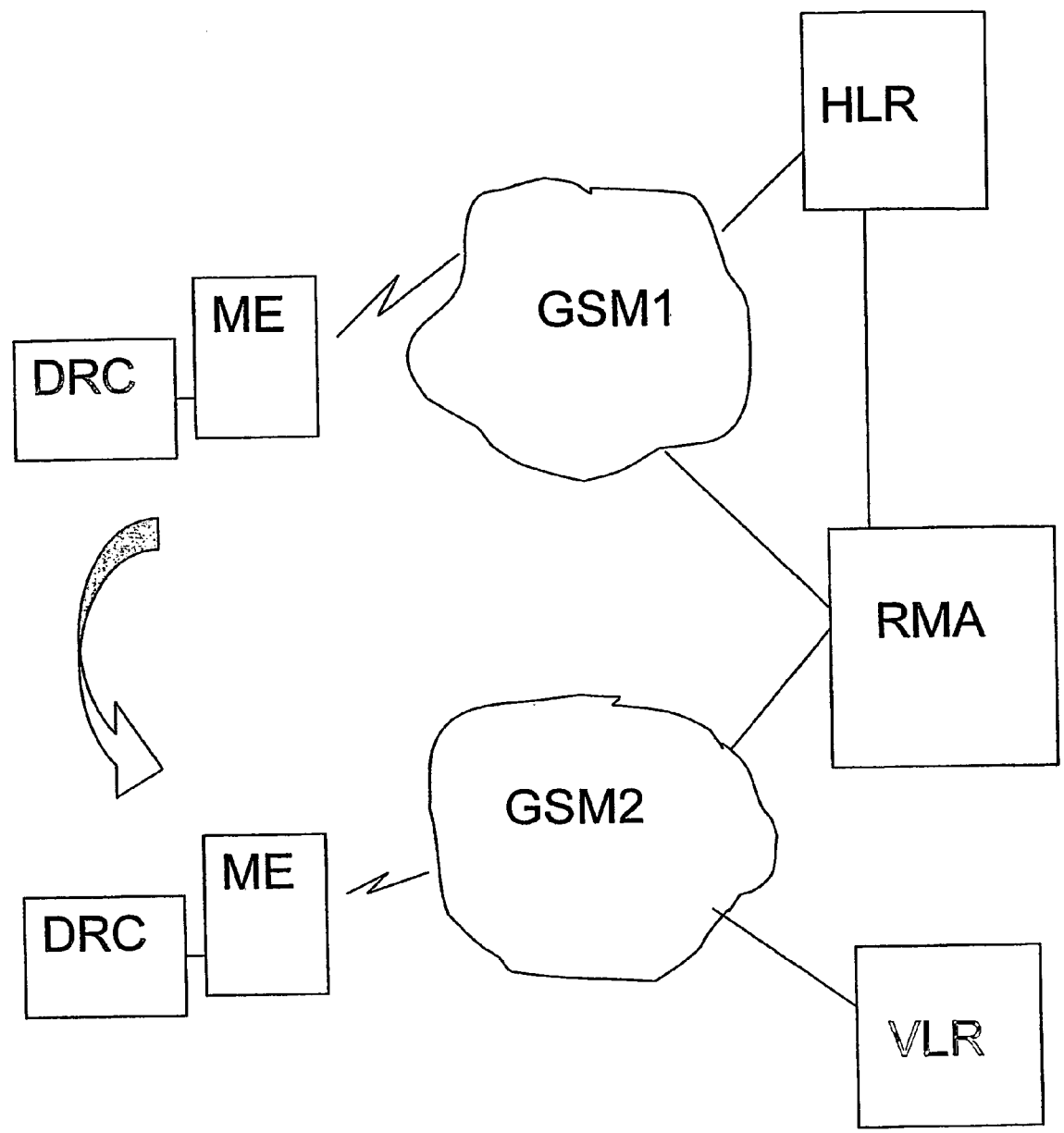

This is a U.S. national phase patent application that claims priority from PCT/SE2003/001881, filed 3 Dec. 2003, that claims priority from Swedish Patent Application No. 0300129-4, filed 17 Jan. 2003.

TECHNICAL FIELD

The invention is concerned with a method for the management of roaming of mobile subscribers between the home network and foreign networks.

BACKGROUND ART

Mobile terminals using The Global System for Mobile Communication (GSM) as standard for digital wireless communications are called GSM phones. GSM has many more services than just voice telephony. Additional services nowadays allow a great flexibility in where and when GSM phones are used. Today's second-generation GSM networks deliver high quality and secure mobile voice and data services (such as SMS/Text Messaging) with full roaming capabilities across the world.

The Subscriber Identity Module (SIM) inside GSM phones is a smart chip that was originally designed as a secure way to connect individual subscribers to the network. There is an on-going evolution of the SIM into a standardized and secure application platform for GSM and next generation networks.

ETSI (the European Telecommunications Standards Institute) is a not-for-profit organization whose mission is to produce the telecommunications standards for use throughout Europe and beyond. ETSI is also a member in 3GPP which drafts the standards for the third generation networks.

The ETSI standard specification TS 100 977 V8.2.0 (2000-05) describes the interface in mobile terminals between the SIM and the Mobile Equipment (ME) within the digital cellular telecommunications system. The 3GPP specification 31.111 specifies USIM Application Toolkit (USAT) which defines an interface between the Universal ICC (UICC) and the Mobile Equipment (ME), and mandatory ME procedures. USAT is a set of commands and procedures for use during the network operation phase of 3G, in addition to those defined in the 3GPP specification TS 31.101 [13]. The 3GPP specification 51.011 defines the interface between the Subscriber Identity Module SIM—Mobile Equipment (ME). It defines usage of this interface during the network operation phase of GSM as well as those aspects of the internal organization of the SIM which are related to the network operation phase. Thus the 3GPP specification 51.011 takes in principle over after GSM 11.11, The logical structure of files in SIM is hierarchical and there are three types of files, i.e. Elementary Files (EF), Dedicated Files (DF) and Master Files (MF), the last mentioned ones being highest in the hierarchy.

Roaming management covers the tools and processes used to control the roaming behavior for the subscribers in a mobile telecommunications network. When a subscriber leaves his home network and receives service from another network, he is said to be roaming.

A subscriber can roam to networks with which the operator of the subscriber's home network has a roaming agreement. Operators tend to have roaming agreements with as many other network operators as possible. However, the case is often that in any given roaming situation, there is one network that is preferred. This could be a network with which the operator has a better agreement and thus pays a lower price for its usage. It could also be a network that belongs to the same operator group as the home operator. The earnings for the subscribers' network usage would thus stay in the same company group if the subscriber could use the preferred networks as much as possible. If the roaming behavior could be efficiently controlled and the subscribers be made to roam into the most preferred network at any given time, large savings could be achieved for the operator. It shall, however, be noted that the opinion on which is the most preferred network may change over time.

Roaming management is thus an important area for the operators to improve the revenue stream. Roaming management gives the operator improved control of what networks its subscribers roam into when the home network can not be reached. Controlling this behavior becomes increasingly important as alliances are formed and the operator needs to manage this behavior on a continuous basis.

Roaming behavior is defined in the telecom standards and is controlled by data that is stored on the SIM (Subscriber Identity Module) card. The handset will modify its roaming behavior based on the contents of the roaming control files on the SIM card.

One such standard, in which the mechanisms that control roaming behavior in the GSM/3G network are defined is TS 23.122 in release 99 version, According to that standard, the roaming behavior is to a large extent controlled by to network selector files on the SIM card of the mobile phone. One of the files is the so-called subscriber-defined PLMN (Public Land Mobile Network) list and the other one is the operator-defined PLMN-list. Older versions of the standard define only one list list of preferred networks.

When the phone shall select a network, it first looks for networks defined in the subscriber defined list. Each network indicated by the subscriber-defined network selector file on the SIM is tried according to the priority order given in that file. If none of the networks listed in that file are possible to select, the phone tries the networks that are listed in the operator controlled network selector file. If still none of these are possible to select, the phone shall randomly choose a network whose signal strength exceeds a threshold value. In reality, this random selection often selects the strongest network. If none of the above methods have succeeded, the phone tries all other networks in order of decreasing signal strength. If the phone receives the information that a network is not allowed for roaming, the phone adds the network to the list of forbidden networks and will not access this network while the phone mains in automatic network selection mode.

However, once the phone is roamed into a network, it will stay on that network. According to the above standard, another file on the SIM shall control how often the phone searches for a higher preference network.

The phone will periodically search for the home network as well as a higher preference non-home network to roam into. Since this periodic network re-selection attempts only consider network of the same country as the network to which the phone is currently registered, the home network will only be attempted when the subscriber is nationally roamed.

The network selection functionality described above is the one defined in TS 23.122 in release 99 version. The functionality is, however, not yet fully implemented in most of the existing phones. This pertains especially to the periodic network re-selection attempts. It is anticipated that future phones will start to support these periodically performed attempts to find a higher preference network.

The fact that most phones do not yet support the periodic network re-selection means that once a phone registers to a non-preferred network, it has a tendency to remain there until something extra-ordinary, like coverage loss, takes place.

Even if the phone is turned off and on, the phone will remember the last network it was roamed onto and will try to go back to that network again by reading the information from the (Location Information) LOCI file on the SIM card. Thus the subscriber remains even longer than needed on the wrong network.

Only if coverage is lost, the phone will search for and switch to another network, which might be a preferred network if that network has coverage.

If no network has coverage, the phone will not be able to register to any network. If the coverage then returns, at the same time, for the previous network and a preferred network, the phone will still tend to register back onto the previous network.

There are a number of mechanisms that are employed today in order to control the roaming behavior as described above. Some of these are described in the following and the weaknesses or short-comings of these are touched upon. All descriptions given assume that the phone performs network selection without user interaction. When network takes places without user interaction, the phone is said to be operating in automatic network selection mode. If network selection is performed by the user, the phone is said to be operating in manual network selection mode. In manual network selection mode, it is in fact the subscriber that manually controls the roaming behavior.

The most basic form of Roaming Management is to define the contents of the roaming control files, i.e. the PLMN list or lists and the network search period, on the SIM cards at the time of issuance. This becomes a static definition of preferred roaming networks.

An improvement to the static model is defined in the GSM 03.48 standard, in which the roaming control files are made updatable over the air. This enables remote update of the roaming control files when price models, agreements and operator constellations change. It is also possible to update the whole subscriber base in this manner. If the operator so chooses, it is possible to limit the group to subscribers that are likely to be roamers.

Due to the reasons described above, the handling of roaming control files as described above is referred to as statistical roaming management since the statistical chance that a subscriber will register with a preferred network is greatly improved if the roaming control files are kept updated. The statistical roaming management thus controls roaming by updating the roaming control files on the SIM. Correctly used, the files can greatly improve the ratio of subscribers that roam into the preferred networks. However, there is never any guarantee that a subscriber will roam onto the preferred network.

The behavior of the statistical roaming management is non-intrusive for the subscriber. The effects are only that a preferred network is chosen initially at network selection or after the defined time period as described above. If no preferred network is present, the subscriber stays on the current network.

If the update of the roaming control files is made before the subscriber enters a roaming area, the phone will select the preferred network if it is present in the area. If the files are updated after the subscriber enters the roaming area, and the subscriber is in the wrong network, the subscriber is connected onto a preferred network only if a loss of coverage of the current network takes place and the preferred network is present.

Due to the above limitations, to the statistical roaming management, solutions for so-called dynamic roaming management exist. In some of these solutions, Dynamic Roaming Management uses active knowledge regarding a subscriber's roaming state and tries to achieve a change in the current roaming situation. In dynamic roaming management, the operator of a subscriber's home network knows when the subscriber roams into a new network. If that is an undesired network, a trigger is generated to a roaming server. The roaming server takes update measures towards the subscriber's SIM to make the phone select a better network. The dynamic roaming management is intrusive to the extent that it attempts to perform an active task of moving the subscriber from one network to another.

In the dynamic roaming management scenario, a special roaming management application (RMA) monitors roaming events in the network, for example by interfacing to the HLR (Home Location Register). When the subscriber roams into a foreign network, the RMA is notified. If the subscriber roamed into a non-preferred network, attempts are made to dynamically move him to a preferred network. This behavior tends to lower the perceived quality of service for the subscriber and might therefore be undesirable from that aspect. Since the operator has a possibility of making money, a dynamic roaming management solution might be employed anyway.

Finally, it shall also be noted that the size of the roaming control file is always going to be limited. That means that it will never be possible to list all the preferred networks in this file.

Operators want to have a more direct control of what network the subscribers roam into even with phones that do no support the periodic network re-selection. Therefore dynamic roaming management is applied.

In the case of dynamic roaming management, the RMA attempts to update the roaming control PLMN-list on the SIM. However, as-described above, this in itself does not make the phone switch networks. When the phone does not support the periodic network re-selection, the measure of only updating the PLMN-list is therefore insufficient. In addition to the PLMN-list update, some other conditions need to be met. As discussed above, such a sufficient condition for switching to the correct network includes losing coverage for the non-preferred network while a preferred network is present. The phone would then switch to the preferred network.

However, this behavior is too non-deterministic for operators that really want to make sure that the phone selects a preferred network.

Therefore, the operators attempt to apply more drastic measures to force the phone to a new network. Such methods include different levels of the refresh command specified in GSM 11.14 possibly in conjunction with the Remote File Management (RFM) application in GSM 03.48. For both of these standard specifications newer versions of the specification with the same basic contents exist.

Such a refresh command can be triggered either as part of the 03.48 RFM or as an instruction to a SIM-based application that in turn triggers the refresh command as specified in GSM 11.14 to the phone. The refresh command has different levels ranging from information to the phone that a specific file on the SIM has been updated to a more or less hard reset of the SIM. The intention of issuing the refresh command is to make the phone search for a preferred network as defined in the roaming control PLMN-lists. This does, however, not work as well as one would hope due to the reasons explained below.

The files on the SIM card and their usage are specified in GSM 11.11. This includes the roaming control files referred to above. In addition to the actual roaming control files, a couple of other files on the SIM affect the network selection behavior. The ones that are subject to usage for dynamic roaming solutions would typically be $EF_{LOCI}$ and $EF_{FPLMN}$. These Elementary Files (EF) specify LOCation Information and Forbidden Public Land Mobile Networks respectively.

The $EF_{LOCI}$ is used by the phone to remember the Location Area it is registered to. The file contains the network identity and the location area in this network that the phone was last registered to. When the phone starts up, or re-initializes the GSM session, it uses the information in $EF_{LOCI}$ to see where it was last registered. The usage of $EF_{LOCI}$ enables the phone to speed up network selection when starting up. From the information in $EF_{LOCI}$ the phone knows which network it was on before it was turned off. When reestablishing network connection, the phone first attempts to register to the network whose identity is found in $EF_{LOCI}$. If this fails, the phone starts the rest of the automatic network selection process. This is the fact that causes the tendency for the network selection to behave in the somewhat sticky way described above.

The area of dynamic roaming management is thus troubled by the case that even if the user turns the phone on and off again after updating the roaming control file, $EF_{LOCI}$ will tend to make the phone go back to the non-preferred network.

To overcome this problem, dynamic roaming solutions attempt to update $EF_{LOCI}$ by remote means. The contents of $EF_{LOCI}$ are then replaced by padding data to indicate that the file is empty or actual network data that does not identify the network the phone is registered to.

When $EF_{LOCI}$ has been updated in the above manner, a refresh is issued to make the phone perform a new network selection. The level of refresh can be attempted at different levels to achieve the network search.

The solution described above has shown less successful than desired. The reason is that the phone restores the correct value of the $EF_{LOCI}$ that indicates the current network rather than the value that was remotely written to the file. This re-write of $EF_{LOCI}$ may take place either as a consequence of receiving the remote command to perform the refresh or from the actual execution of the refresh command by the phone. In any case, that nullifies the attempt to clear the $EF_{LOCI}$ and the phone will once again go back to the non-preferred network.

The $EF_{FPLMN}$ specifies networks that are explicitly forbidden for the subscriber to roam into. In applying dynamic roaming management solutions, it is possible to use the $EF_{FPLMN}$ to improve the chances of getting the subscriber to move into the preferred network. The usage also has some severe drawbacks.

A possible usage of $EF_{FPLMN}$ in dynamic roaming is to take the network identity of the non-preferred network that the subscriber is currently roamed into and write that network identity into the $EF_{FPLMN}$ using remote update. When the roaming control PLMN-list is correct and contains the preferred network or networks, the dynamic roaming management solution can issue a refresh action of some severity that has been judged necessary, possibly a hard reset. When the phone re-initializes (i.e. selects a network again), it will find the information in $EF_{LOCI}$ regarding most recent network. However, since that network is also listed in the $EF_{FPLMN}$, the phone is not allowed to select that network. Therefore, the phone is forced to select another network and will thus attempt the networks listed in the roaming control PLMN-list. Therefore, if a preferred network is available, the phone will select it.

When the RMA detects that the subscriber has roamed onto a preferred network, it can do another remote update and remove the non-preferred network from the $EF_{FPLMN}$.

Obviously, the handling described concerning the $EF_{FPLMN}$ can cause severe service disruptions to the subscriber. In addition to losing network connection while forced to search for another network, there is a risk that the non-preferred network that the subscriber was roamed to was the only one with coverage in the area. This means that the subscriber will be without service until another network becomes present.

Regardless of the disadvantages of using the $EF_{FPLMN}$, some operators have still chosen to mechanism since the value of correct roaming has been judged as higher than the negative effects of subjecting the subscriber to service loss. This is clearly not a generally acceptable behavior.

THE OBJECT OF THE INVENTION

The object of the invention is therefore to develop a dynamic roaming method with improved functionality.

SUMMARY OF THE INVENTION

The method of the invention is concerned with management of roaming of mobile subscribers between a home network and foreign networks. In the method, the roaming behavior of a mobile terminal is based on roaming settings in the form of contents of different control files saved in the mobile terminal of the subscribers. A first file contains a list of networks to be used in a priority order in a roaming situation and a second file contains information about the last network the subscriber was registered in. It is the second file that primarily is used as information in the roaming situation. The method starts with roaming of the subscriber from one network to another network, and checking the current roaming setting for the subscriber. If the network that the subscriber roamed into does not correspond to the highest priority network, the subscriber is moved to a preferred network corresponding to the priority order of said list. The moving takes place by saving changed second file information to be used in the moving and sending the information about said change to the mobile terminal. The network connection is then re-established by the mobile terminal by selecting the preferred network from said changed information.

The saving is performed either by updating said second file or by saving the new second file information in a place other than the second place. The choice of where to temporarily save such information in another place than in the file depends on the chosen embodiment: The information could be stored in a file that is under the exclusive control of the embodiment of the DRC or in any other place judged suitable for the embodiment.

The preferable embodiments of the invention are presented by the subclaims.

Preferably, said checking is either performed by a roaming management application (RMA), which detects if the subscriber is not on the preferred network and decides td use dynamic roaming to actively move the subscriber to a preferred network or this is done by a separate dynamic roaming client (DRC). The updating of the second file is performed by DRC either directly or after having received a command sent by the RMA.

Said files can be elementary files (EF) of SIM cards specified in GSM 11.11, whereby said first file is $EF_{PLMN}$ and said second file is $EF_{LOCI}$. The mobile terminal can be a mobile phone.

Information about said updating to the mobile terminal is forwarded by sending a proactive refresh command to the mobile terminal according to GSM 11.14 or TS 31.111.

A possible embodiment of the invention is to place the dynamic roaming client as a plug-in to a SIM or Smart Card based interpreter. Examples of such Smart Card based interpreters can be the SmartTrust WIB™, the USAT Interpreter specified as part of the 3GPP in specifications TS 31.113, 31.113 and 31.114 or any other similar specification. These interpreters have the ability to dynamically interpret byte-code command sequences and execute accordingly. These interpreters thus implement program execution environments where the byte-code command sequences form the programs that are executed. The solution can also be embodied as a separate application on the SIM card or a USIM card.

The invention makes the file update operations and the refresh operation be as close to each other as possible. In the embodiment of a plug-in, this means that there shall be a client that has the right to update $EF_{LOCI}$. The byte code script that is executed by the interpreter would then cause the interpreter to update $EF_{LOCI}$ and thereafter issue a refresh command as specified in GSM 11.14 to the terminal.

Any alternate embodiments can be achieved in a similar way. The intention is to make sure that the remote command is delivered to the SIM in a whole that is executed together. The intention is to avoid a scenario where the $EF_{LOCI}$ is first updated remotely and when this update is ready, another remote command is issued to initiate the refresh. The second command delivery risks triggering a new location update and a possible update of $EF_{LOCI}$. This would mean that the previous update of $EF_{LOCI}$ became undone and the refresh serves no purpose. By making sure that these operations are contained in the same data sequence, the intermediate roll-back of $EF_{LOCI}$ can be avoided.

In the case where the $EF_{LOCI}$ change that is made gets rolled back by the phone as an integral part or a side effect of executing the refresh command, the invention provides an optional extension to the above functionality. Depending on embodiment and operating possibilities a couple of alternate extensions exist.

In the first possible extension, the embodiment of the invention on the SIM card shall detect re-initialization of the SIM card after performing the dynamic roaming management operations described previously. When such a first re-initialization of the SIM (reestablishing of network) after dynamic roaming management operations is performed, the embodiment shall detect this and alter the contents of the $EF_{LOCI}$ before the phone reads it. The data to be stored in $EF_{LOCI}$ can be either padding data or true data of a preferred network. In the cases where correct network identifying data can be put into $EF_{LOCI}$, the advantages of quick network selection as described in the previous chapter can be maintained.

If possible, the embodiment may also choose to alter value that is returned to the mobile terminal when it issues a read command for $EF_{LOCI}$ in the first SIM re-initialization following a dynamic roaming management operation. This would imply that rather than attempting to write alternate data to the file, the embodiment intercepts the $EF_{LOCI}$ read operation and sends either padding data or correct network identifying data that identifies a preferred network.

Also note that the above descriptions of remote triggering of the action can be replaced by a local trigger on the SIM card or a locally stored control sequence. One embodiment of such a control sequence would be in a SIM card interpreter but the logic could also be coded into a separate application on the SIM card. It could be envisioned that any embodiment could exist.

Furthermore the names of the files might be different than the ones used in this document.

In the following, the invention is described by means of some advantageous embodiments by means of figures. The invention is not restricted to the details of the embodiments.

FIGURES

FIG. 1 is a view of the environment, wherein the invention can be used.

Figure 2:
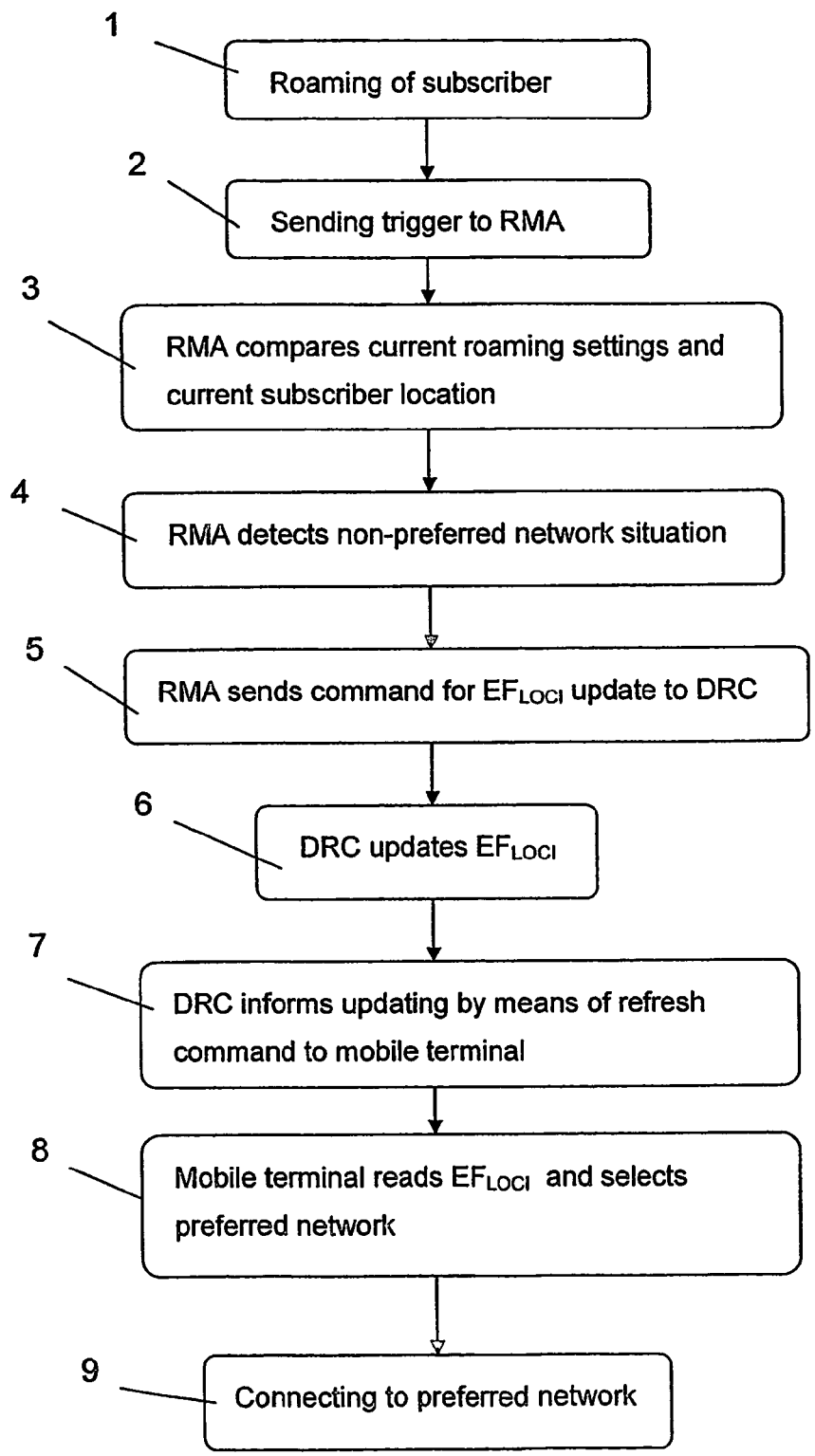
Figure 3:
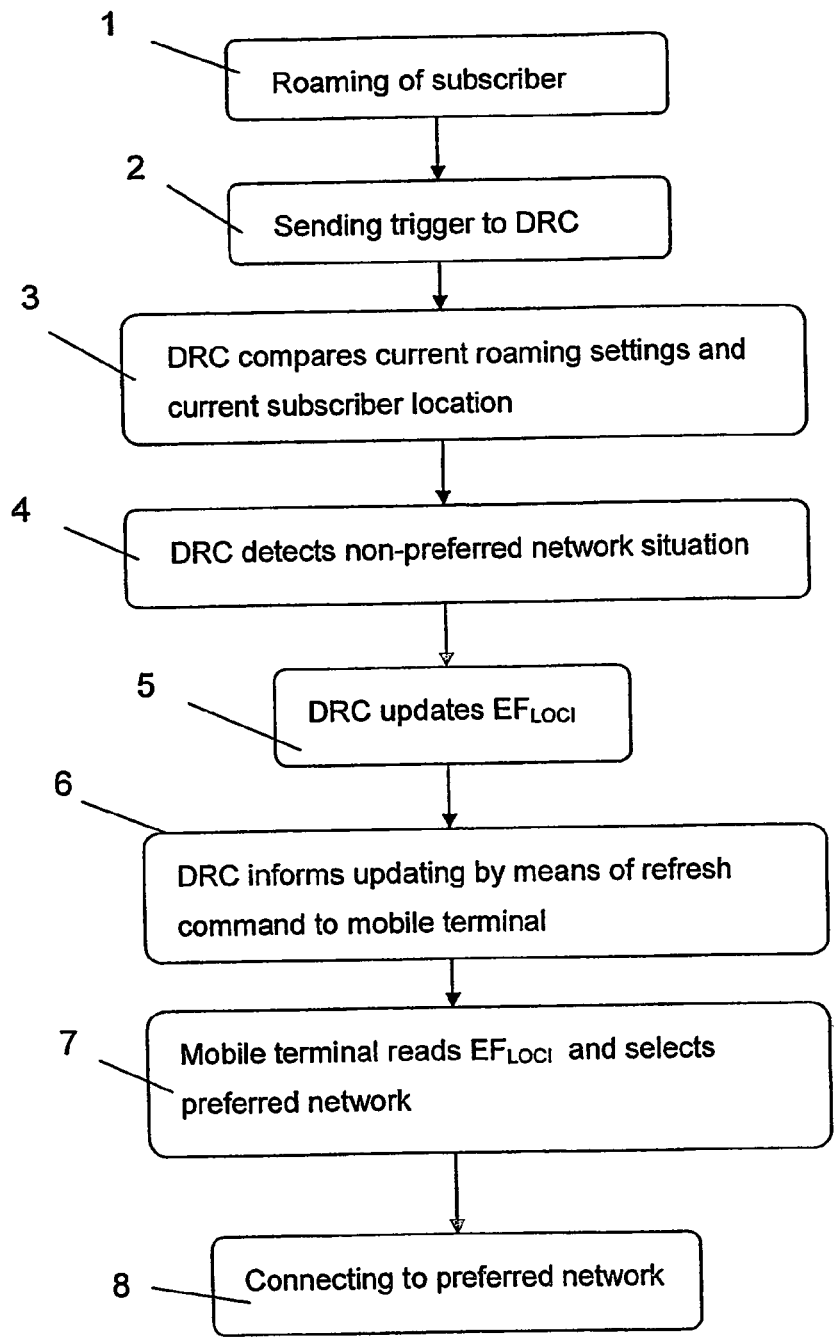
Figure 4:
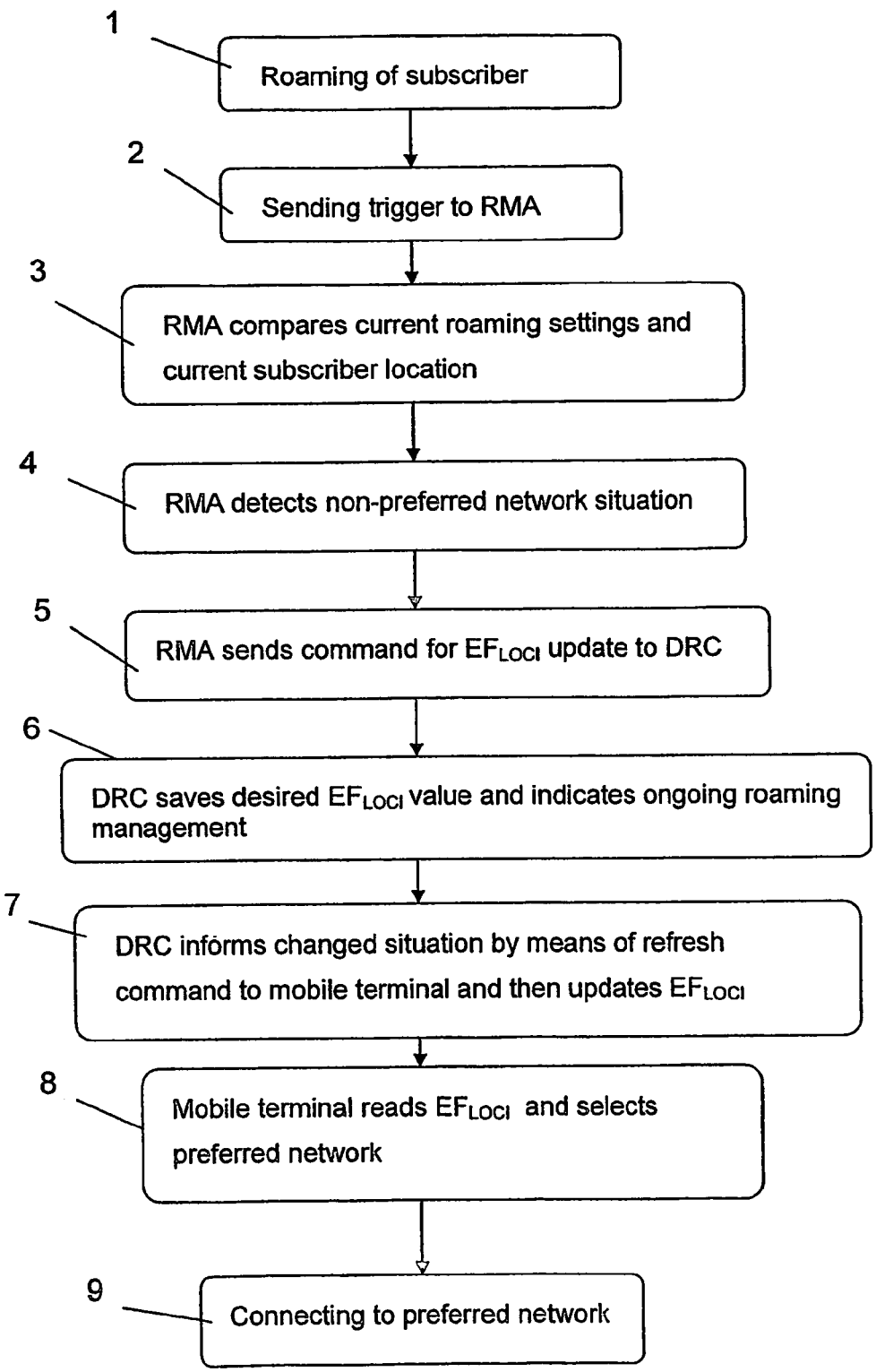
Figure 5:
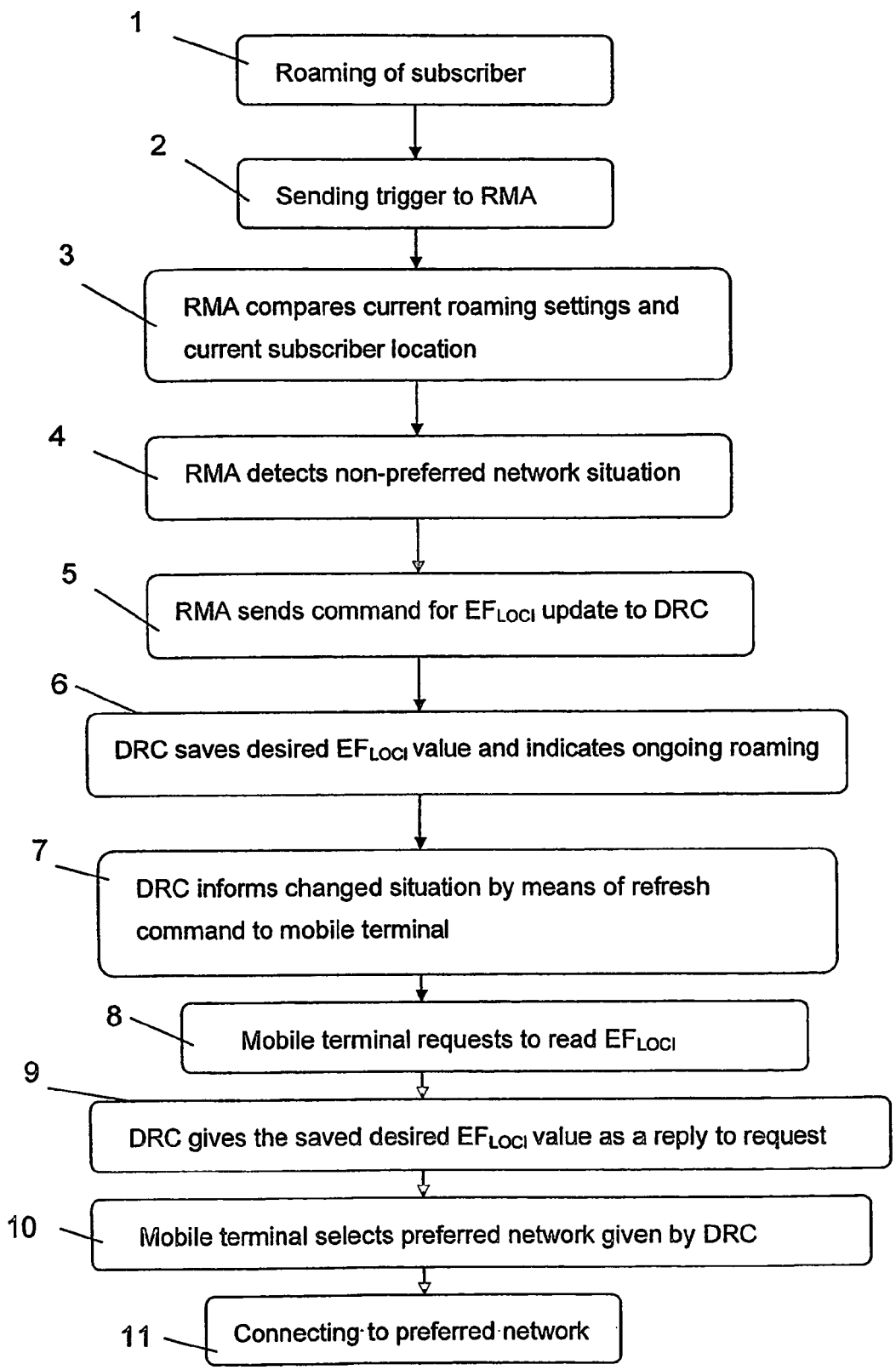
Figure 6:
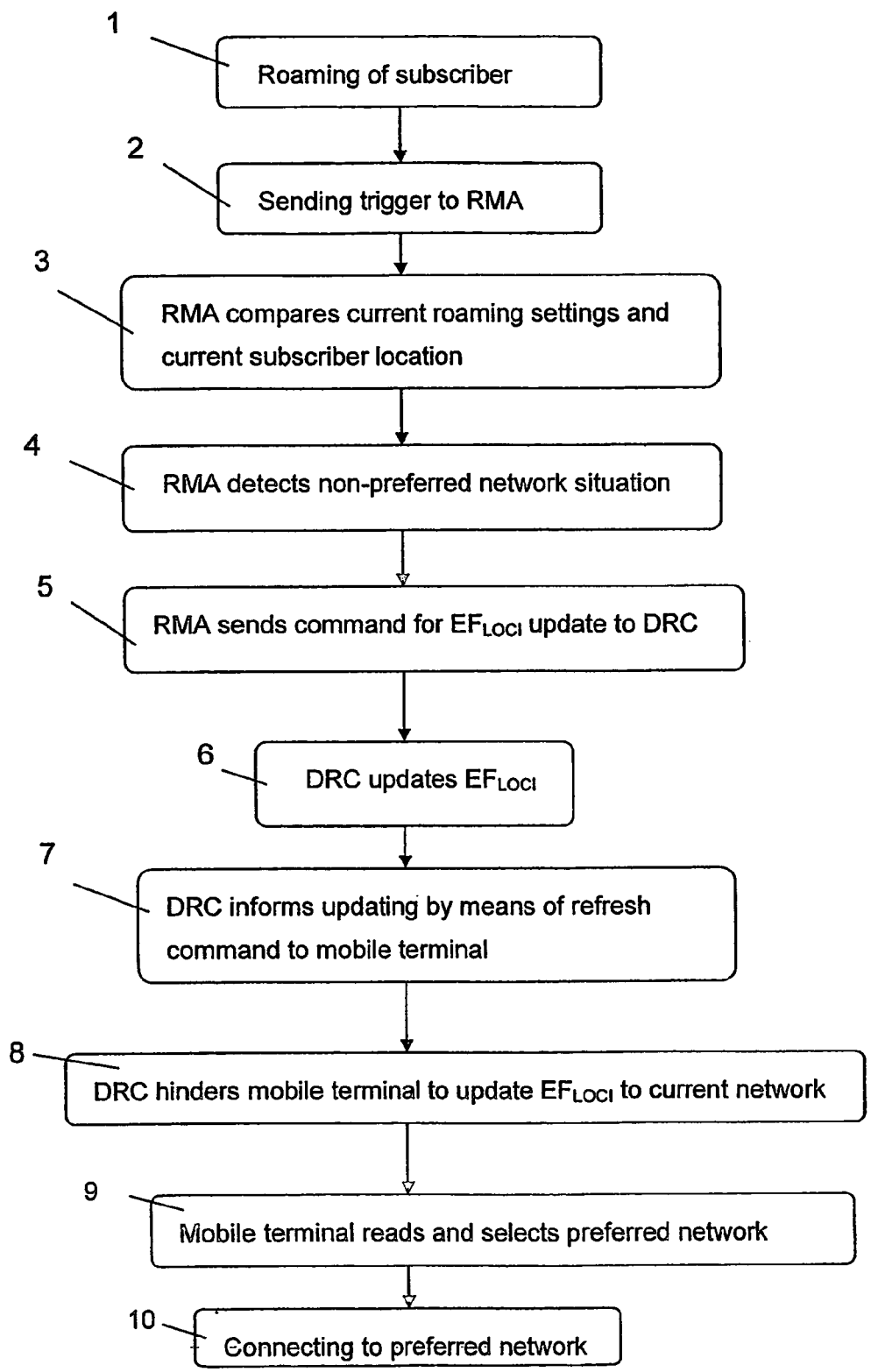

FIG. 2 presents a flow scheme of a first embodiment of the method of the invention FIG. 3 presents a flow scheme of a second embodiment of the method of the invention FIG. 4 presents a flow scheme of a third embodiment of the method of the invention FIG. 5 presents a flow scheme of a fourth embodiment of the method of the invention FIG. 6 presents a flow scheme of a fifth embodiment of the method of the invention

DETAILED DESCRIPTION

FIG. 1 presents a scenario, wherein a mobile subscriber with the mobile terminal ME moves from a first network GSM1 to another GSM2. In this embodiment, GSM1 is assumed to be the home network even if the invention equally well can be applied in a situation wherein the subscriber moves from one foreign network to another. HLR is the home location register of subscribers belonging to network GSM1. The method of the invention is applied in a situation, wherein roaming of the ME from GSM1 to GSM2 takes place, which is indicated with an arrow in FIG. 1.

The HLR is always aware of in which network the subscribers are. The roaming is managed by a roaming management application in a roaming server, which gets the information about the roaming situations of subscribers from e.g. the HLR.

When the ME has entered a new, foreign network GSM2, the subscriber is registered in the Visitor Location Register (VLR) of the foreign network and the HLR of the network GSM1 is updated. The HLR can now send the roaming trigger to the RMA. The roaming trigger could also be generated from another origin.

In the method of the invention, it is checked if the subscriber roamed into the preferred network. Preferably, said checking is either performed by the roaming management application (RMA), which detects if the subscriber is not on the preferred network and decides to use dynamic roaming to actively move the subscriber to a preferred network or this is done by a separate dynamic roaming client (DRC).

FIG. 2 presents an overall flow scheme of an embodiment of the method of the invention. The method of the invention is concerned with management of roaming of mobile subscribers between a home network and foreign networks. In the method, the roaming behavior of a mobile terminal is based on roaming settings in the form of contents of different control files saved in the mobile terminal of the subscribers. A first file contains a list of networks to be used in a priority order in a roaming situation and a second file contains information about the network the phone was most recently registered to. Said files are elementary files (EF) specified in GSM 11.11, whereby said first file is $EF_{PLMN}$ and said second file is $EF_{LOCI}$.

When the subscriber roams from one network to another (step 1 of FIG. 2) he is connected to a network with the highest possible preference in said list. This means that the network with the highest priority is tried first and if that network is not available, the next network in the list is tried and so on until a connection is achieved. Thus, the selected network is in practice not always the highest priority network according to the list. Furthermore, most phones, once a phone registers to a non-preferred network, has a tendency to remain there until something extra-ordinary, like coverage loss, takes place. So even if the phone is turned off and on, the phone will remember the last network it was roamed onto and will try to go back to that network again by reading the information from the (Location Information) LOCI file on the SIM card. Thus, in the practice, the network is often primarily selected on the basis of the information in the LOCI file and not from the list. Without the invention, the subscriber would therefore remain even longer than needed on the wrong network.

As a result of the roaming of the subscriber in step 1, The Home Location Register (HLR) immediately gets information of the roaming after which a trigger is sent to a Roaming Management Application (RMA) situated in the roaming server (Step 2 of FIG. 2) about the roaming. The RMA now checks the current roaming setting (the priority list of networks) for the subscriber and compares it to the location that the subscriber roamed into (in step 3 of FIG. 2).

In step 4, RMA detects that the subscriber is not on the desired network and therefore decides to use dynamic roaming to actively move the subscriber to a preferred network.

In step 5, RMA prepares a command packet to instruct the DRC to perform dynamic roaming actions for moving the subscriber to the preferred network. This command packet contains specific instructions for updating the LOCI file on the SIM card ($EF_{LOCI}$). The command packets carry the logical protocol between the RMA and DRC. The exact form and content of the command packet will depend on the actual embodiment of the DRC. These dynamic roaming management command packages and sent over-the-air to a dynamic roaming client (DRC). One possible embodiment of placing the DRC is as a plug-in to a SIM based or Smart Card based interpreter. Another possible embodiment is as a separate application on the SIM card or a USIM card.

In step 6, DRC updates $EF_{LOCI}$ according to data in the command packet.

In step 7, information about said updating is sent to the mobile terminal, which is performed by sending a proactive refresh command to the mobile terminal according to GSM 11.14 or TS 31.111.

As a consequence of the refresh command, the mobile terminal re-establishes the network connection. The network selection will be controlled by the contents of the file on the SIM or USIM card. Most notably, the mobile terminal will be reading and selecting from $EF_{LOCI}$ the preferred network in step 8 (re-initializes the SIM).

In step 9, the phone connects to the preferred network.

RMA receives notification that the phone is on the preferred network and can adjust any operations accordingly, if so desired as a consequence of the change of the network.

FIG. 3 presents an overall flow scheme of another embodiment of the method of the invention. As in FIG. 2, the subscriber roams from one network to another in step 1. In this embodiment the trigger about the roaming is directly sent to the Dynamic Roaming Client in step 2. The DRC checks the current roaming setting (the priority list of networks) for the subscriber DRC detects that the subscriber is not on the desired network and therefore decides to use dynamic roaming to actively move the subscriber to a preferred network. Thereafter, the method proceeds as in steps 6-9 of FIG. 2, being steps 5-8 in FIG. 3.

FIG. 4 presents a flow scheme of a third embodiment of the method of the invention. Steps 1-5 corresponds to the steps presented in connection with FIG. 2.

In step 6, DRC saves the desired value of $EF_{LOCI}$ in some other place than in $EF_{LOCI}$ and set an indication that dynamic roaming is ongoing. Thus, DRC stores information that a dynamic roaming management operation is being performed but is implemented NOT to explicitly write the contents of the $EF_{LOCI}$ on the SIM card in this step. This is relevant in a situation, wherein the mobile terminal updates the $EF_{LOCI}$ as a direct consequence of executing the refresh command in step 7. If this is the case, as is assumed in FIG. 4, DRC can choose only to store information that dynamic roaming is ongoing and which is the preferred network.

Said files with which the roaming behavior is managed is the list of preferred networks as well as $EF_{LOCI}$, which remembers the last location, including the network in which the mobile terminal was. These files are read by the mobile terminal, which understands their content. In addition to these files, DRC can have specific files for the function of DRC. DRC might have an additional file of its own file, in which extra information is saved or DRC can have several files for saving specific information. Information can e.g. be saved in a file on the SIM card, in another memory on the SIM card, in the same file in the SIM card or in different files on the SIM card.

For example, DRC could have a file named $EF_{RoamingManagmentStatus}$, with the values "ongoing" or "finished", or "0", or "1". DRC could have another file, $EF_{DRCLociValue}$ containing the value to be written in $EF_{LOCI}$ or to be returned as a response to a read request according to given embodiments. Other implementations are of course also possible.

In step 7, DRC indicates changed situation for the mobile terminal, which is performed by sending a proactive refresh command to the mobile terminal according to GSM 11.14 or TS 31.111 and then updates $EF_{LOCI}$. Naturally, DRC will perform the update of $EF_{LOCI}$ at a later point in time than any update of $EF_{LOCI}$ by the mobile terminal would take place as discussed in the foregoing paragraph.

As a consequence of the refresh command, the mobile terminal re-establishes the network connection. The network selection will be controlled by the contents of the file on the SIM or USIM card. Most notably, the mobile terminal will be reading and selecting from the preferred network in step 8 (re-initializes the SIM).

In step 9, the phone connects the preferred network.

RMA receives notification that the phone is on the preferred network and can adjust any operations accordingly, if so desired as a consequence of the change of the network.

FIG. 5 presents a flow scheme of a fourth embodiment of the method of the invention. Steps 1-6 correspond to the steps presented in connection with FIG. 4.

In step 7, DRC indicates the changed situation for the mobile terminal, which is performed by sending a proactive refresh command to the mobile terminal according to GSM 11.14 or TS 31.111.

In step 8, the mobile terminal requests to read $EF_{LOCI}$.

In step 9 DRC gives the saved desired $EF_{LOCI}$ value as a reply to the request, i.e. intercepts the mobile terminal attempt to read $EF_{LOCI}$ and answers with the value saved in step 6 rather than the physical value of $EF_{LOCI}$.

In step 10, the mobile terminal selects the preferred network given by DRC and connecting to the preferred network takes place in step 11.

FIG. 6 presents a flow scheme of a fifth embodiment of the method of the invention. Steps 1–7 in FIG. 6 corresponds to the same steps 1–7 as in FIG. 2.

In step 8, DRC hinders the mobile terminal to update the $EF_{LOCI}$ to contain information about the current network. Thus, also in the embodiment of FIG. 6, it is taken into consideration that the mobile terminal might update the $EF_{LOCI}$ to the network the mobile terminal was in as a direct consequence of executing the refresh command in step 7 by intercepting any attempt from the mobile terminal to write a new value to $EF_{LOCI}$ until the network is changed to the preferred one.

In step 9, the mobile terminal then reads $EF_{LOCI}$ and selects the preferred network, and connects to it in step 10.

Many combinations of the above embodiments are possible and the invention is of course not restricted to the above embodiments, which are meant to be presented as examples. Thus, the combinations are non-exhaustive and other possible combinations may exist. The important goal is to make the result of the read operation of $EF_{LOCI}$ be the value of $EF_{LOCI}$ that DRC wishes the mobile terminal to see.

E.g. in cases where the DRC does not perform a direct write operation of the $EF_{LOCI}$ as in FIGS. 4 and 5, the DRC looks for the information that a dynamic roaming action is ongoing. In FIG. 4, the DRC looks for the information about whether dynamic roaming is ongoing in step 7 after the mobile has received the refresh command and is acting on it. The presence of this information causes DRC to update $EF_{LOCI}$ with the desired value. In FIG. 5, the DRC uses this information when executing step 9. This information was possibly stored in step 6. If that information is found DRC changes the contents of the $EF_{LOCI}$ or prepares to intercept the next read operation of $EF_{LOCI}$ from the phone. The goal is to ensure that the first time the mobile terminal attempts to read the value of $EF_{LOCI}$ during re-initialization, it shall see the value that DRC desires that it shall see.

Generally, the purpose of step 7 (the refresh command) is to inform the mobile terminal that changes of importance has taken place. The goal of the action is to make the mobile terminal re-initialize its network selection and again register to the network. The network shall be the one DRC has decided.

The purpose of step 6 is to perform any action necessary or possible to perform before step 7 to assist in achieving the goal of changing networks.

The purpose of step 8 is to perform any action necessary or possible to perform after step 7 to assist in achieving the goal of changing networks.

In step 8 (step 7 in FIG. 3) the mobile terminal acts in accordance with the refresh command, which may vary, since it can mean that the mobile terminal restarts its communication with SIM and reads all data again. In some levels of refresh this can even mean that the user has to input the PIN again, depending on which level is used. According to TS 31.111, a REFRESH requests the ME to carry out an initialization, and/or advises the ME that the contents or structure of EFs on the SIM have been changed. The command also makes it possible to restart a card session by resetting the SIM. The different levels are standardized. All levels are not useful in the invention. The levels most useful are indicated after the following list. There are seven levels according to TS 31.111 version 5.3.0.

USIM Initialization

This mode tells the mobile terminal to perform USIM initialization as defined in TS 31.102 [14] starting after the PIN verification procedure.

USIM File Change Notification

This mode informs the mobile terminal of the EFs that have been changed so the mobile terminal can re-read these files if necessary.

USIM Initialization and File Change Notification

This is a combination of the two above modes above.

USIM Initialization and Full File Change Notification

This mode causes the mobile terminal to perform the USIM initialization procedure as in the first mode above and informs the ME that several EFs have been changed.

UICC Reset

This mode causes the mobile terminal to run the UICC (VAD ÄR?) session termination procedure in accordance with TS 31.101 [13], perform a reset of the UICC and start a new application session USIM Application Reset.

This mode causes the mobile terminal to run the 3G session termination and the USIM application closure procedures in accordance with TS 31.102 [14] and thereafter perform the USIM initialization procedure.

3G Session Reset.

This mode is equivalent to "USIM Initialization and File Change Notification" but also requires the mobile terminal to perform the MM Restart procedure defined in 3G 23.122 [7].

The most useful levels for the invention are USIM Initialization, USIM Initialization and File Change Notification, SIM Initialization and Full File Change Notification, UICC Reset, USIM Application Reset, and 3G Session Reset.

Future versions of the standard might contain more levels, the use of which belongs to the scope of the claims. The invention shall therefore not be limited to the levels indicated above.

The invention claimed is:

1. A method for the management of roaming of a mobile subscriber between a home network and foreign networks, in which method a roaming behavior of a mobile terminal is based on roaming settings in a form of contents of different control files saved in the mobile terminal of the subscriber, a first file containing a list of networks to be used in a priority order in a roaming situation and a second file containing information about the last network the subscriber was registered in, information in the second file being primarily used over the list of networks contained in the first file in the roaming situation, the method comprising:

a) the subscriber roaming from one network to another network, b) checking a current roaming setting for the subscriber and, c) when the network that the subscriber roamed into does not correspond to a highest available priority network according to the priority order of the list of networks contained in the first file, a dynamic roaming client identifying a preferred network, the preferred network corresponding to the highest available priority network according to the priority order, and d) starting up or re-initializing a network connection of the mobile terminal in the roaming situation, preventing a selection of the most recently used network contained in the second file that the subscriber was registered in when the most recently used network is different from the preferred network, the dynamic roaming client selecting the preferred network although the preferred network is different from the recently used network contained in the second file, sending information about the selection of the preferred network to the mobile terminal, the dynamic roaming client moving the subscriber to the preferred network regardless of and overriding the most recently used network contained in the second file that the subscriber was registered in.

2. The method of claim 1, wherein the method further comprises updating the mobile terminal by updating the said second file to be in accordance with the list of networks.

3. The method of claim 2, wherein information about the updating is sent to the mobile terminal as a consequence of which the network connection is re-established by the mobile terminal by reading and selecting the preferred network from the updated second file.

4. The method of claim 2, wherein the step of updating the mobile terminal is performed by saving a desired value of the second file in some other place than the second file and by setting an indication that dynamic roaming is ongoing.

5. The method of claim 4, wherein the second file is updated after which the network connection is re-established by the mobile terminal by reading and selecting the preferred network from the second file.

6. The method of claim 4, wherein any attempt by the mobile terminal to read the second file is intercepted by answering with the desired value saved in the other place than the second file, after which the network connection is re-established by the mobile terminal by using the saved desired value.

7. The method of claim 1, wherein any attempt from the mobile terminal to write a new value to the second file until the preferred network is roamed into is intercepted.

8. The method of claim 1, wherein step b) is performed by a roaming management application which detects if the subscriber is not on the preferred network and decides to use dynamic roaming to actively move the subscriber to the preferred network.

9. The method of claim 8, wherein in order to actively move the subscriber to the preferred network, the roaming management application sends a command to the dynamic roaming client.

10. The method of claim 1, wherein the dynamic roaming client detects if the subscriber is not on the preferred network and decides to use dynamic roaming to actively move the subscriber to the preferred network.

11. The method of claim 1, wherein step d) is at least partially performed by a dynamic roaming server.

12. The method of claim 1, wherein the files are elementary files (EF) in the SIM card of the mobile terminal, which are specified in GSM 11.11 so that the first file is $EF_{PLMN}$ and the second file is $EF_{LOCI}$.

13. The method of claim 1, wherein a proactive refresh command is sent to the mobile terminal according to GSM 11.14 or TS 31.111.

14. The method of claim 13, wherein the refresh command to the mobile terminal according to GSM 11.14 or TS 31.111 is at least one of level commands USIM Initialization, USIM Initialization and File Change Notification, SIM Initialization and Full File Change Notification, UICC Reset, USIM Application Reset and 3G Session Reset.

15. The method according to claim 1, wherein the method further comprises saving the selection of the preferred network in a place other than the second file.

* * * * *